United States Patent [19]

Haynes et al.

[11] Patent Number: 5,072,694
[45] Date of Patent: Dec. 17, 1991

[54] PET BED AND ENCLOSURE

[76] Inventors: William A. Haynes, 40 S. Beechem Rd., Williamstown, N.J. 08094; William M. Haynes, 23 S. Jackson St., Batavia, Ill. 60510

[21] Appl. No.: 609,740
[22] Filed: Nov. 6, 1990
[51] Int. Cl.⁵ .............................................. A01K 1/02
[52] U.S. Cl. ..................................... 119/19; 135/102; 135/116; 5/121; 5/128
[58] Field of Search ................ 119/19; 135/102, 104, 135/116; 5/121, 122, 127, 128

[56] References Cited

U.S. PATENT DOCUMENTS

| | | | |
|---|---|---|---|
| 2,475,515 | 7/1949 | Potter | 135/104 |
| 3,165,110 | 1/1965 | Brooks | 135/1 |
| 3,223,098 | 12/1965 | Dole, Jr. | 135/104 |
| 3,308,789 | 3/1967 | Artig | 119/19 |
| 3,814,058 | 6/1974 | Thompson | 119/19 |
| 3,848,279 | 11/1974 | Ipsen, Jr. | 5/121 X |
| 3,989,008 | 11/1976 | Neumann | 119/19 |
| 4,576,116 | 3/1986 | Binkert | 119/19 |
| 4,729,343 | 3/1988 | Evans | 119/19 |
| 4,802,443 | 2/1989 | Denmark | 119/19 |
| 4,819,680 | 4/1989 | Beavers | 135/104 |
| 4,852,598 | 8/1989 | Griesenbeck | 135/102 |
| 4,945,584 | 8/1990 | LaMantia | 135/104 X |
| 4,974,621 | 12/1990 | Lerma | 135/116 X |

FOREIGN PATENT DOCUMENTS 941458 11/1963 Fed. Rep. of Germany .
567808 6/1924 France .

Primary Examiner—Gene Mancene
Assistant Examiner—R. Thomas Price
Attorney, Agent, or Firm—Thomas A. Lennox

[57] ABSTRACT

A pet bed and enclosure device specifically designed for cats includes a spring support device from which is suspended a cloth panel bed. The spring support device includes an upper square frame supported over a lower square frame by two spring steel members attached at a rear section of the upper frame and angled forwardly and attached to the front section of the base frame. A fabric cover enclosure is supported by resilient support members pulled into a round shape by tab ends extending from each corner of the cover which wrap around the upper frame and hook onto horizontal hook members extending inwardly from the corners of the upper frame. A hole in the cover allows the cat to enter the enclosure and rest on the cloth bed that is springably supported.

19 Claims, 3 Drawing Sheets

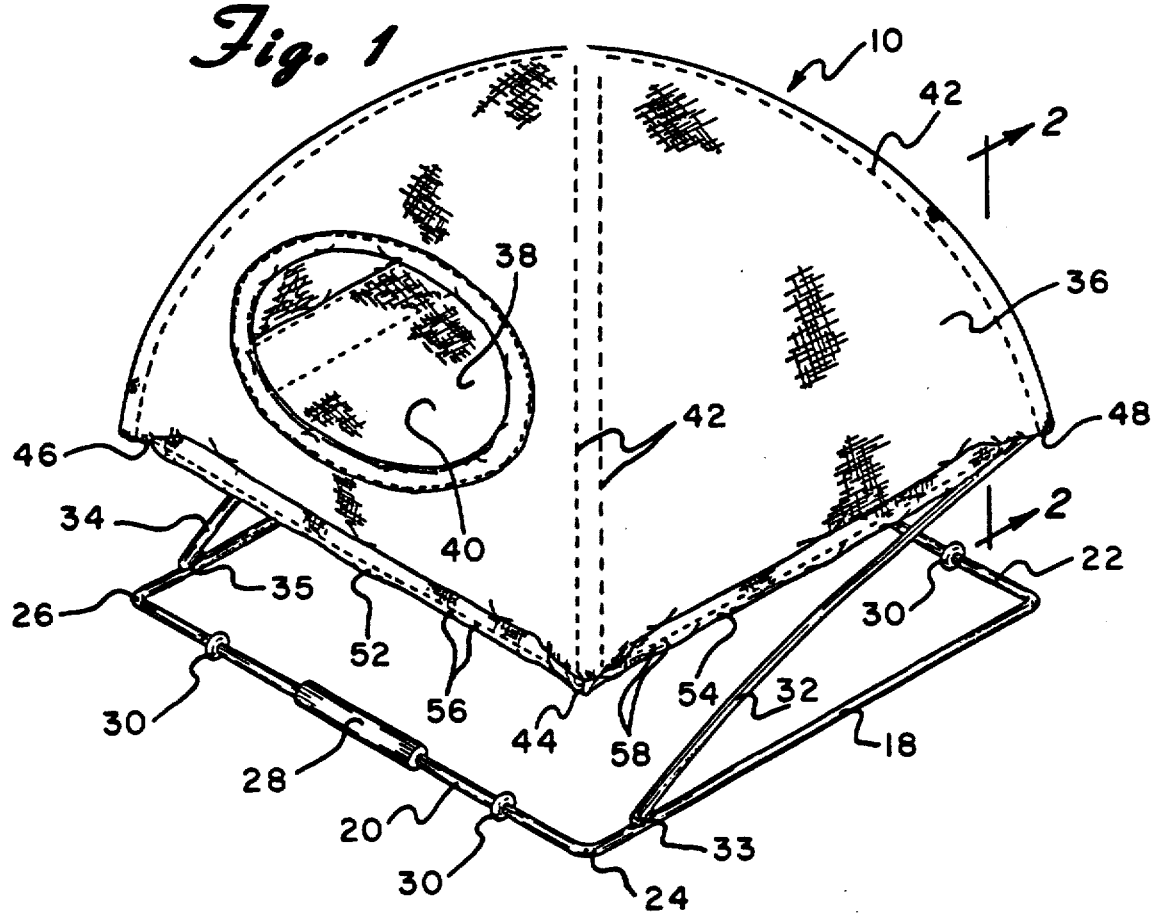
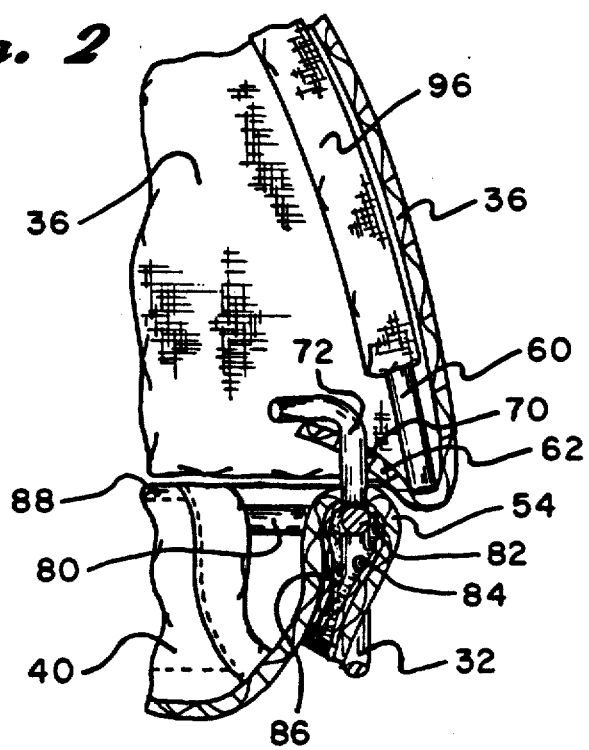

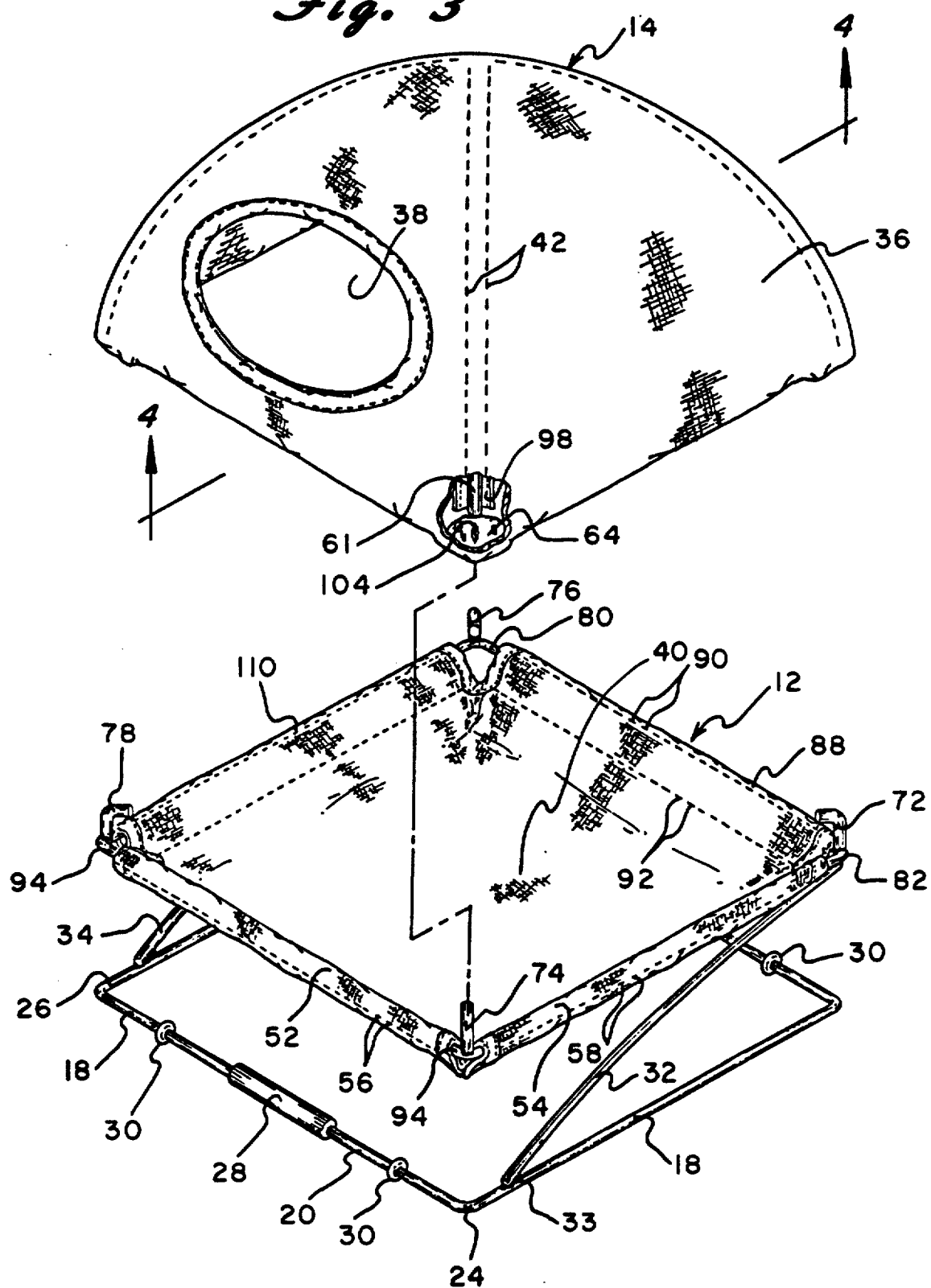

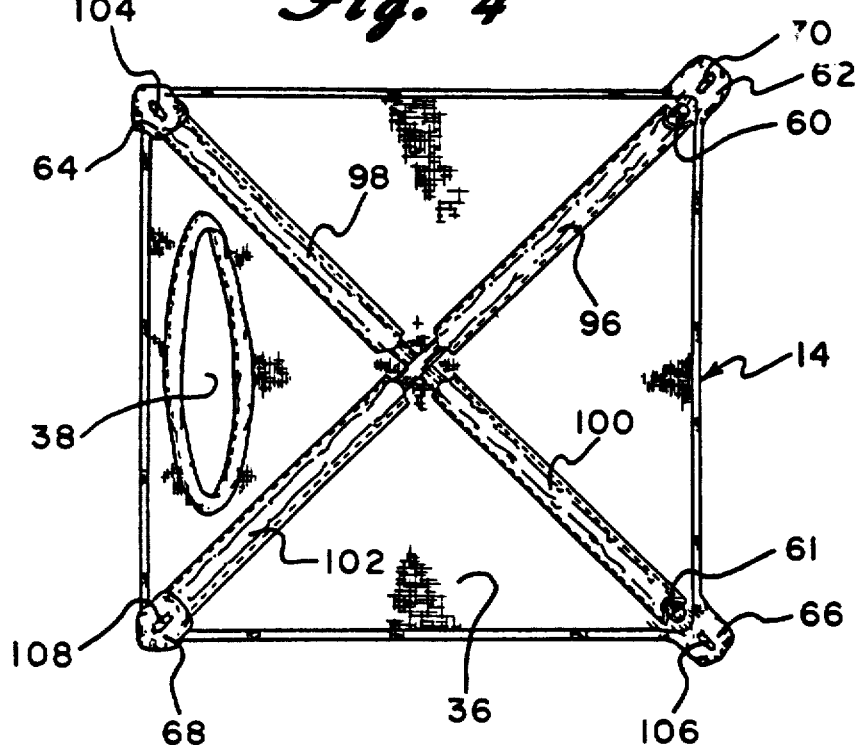
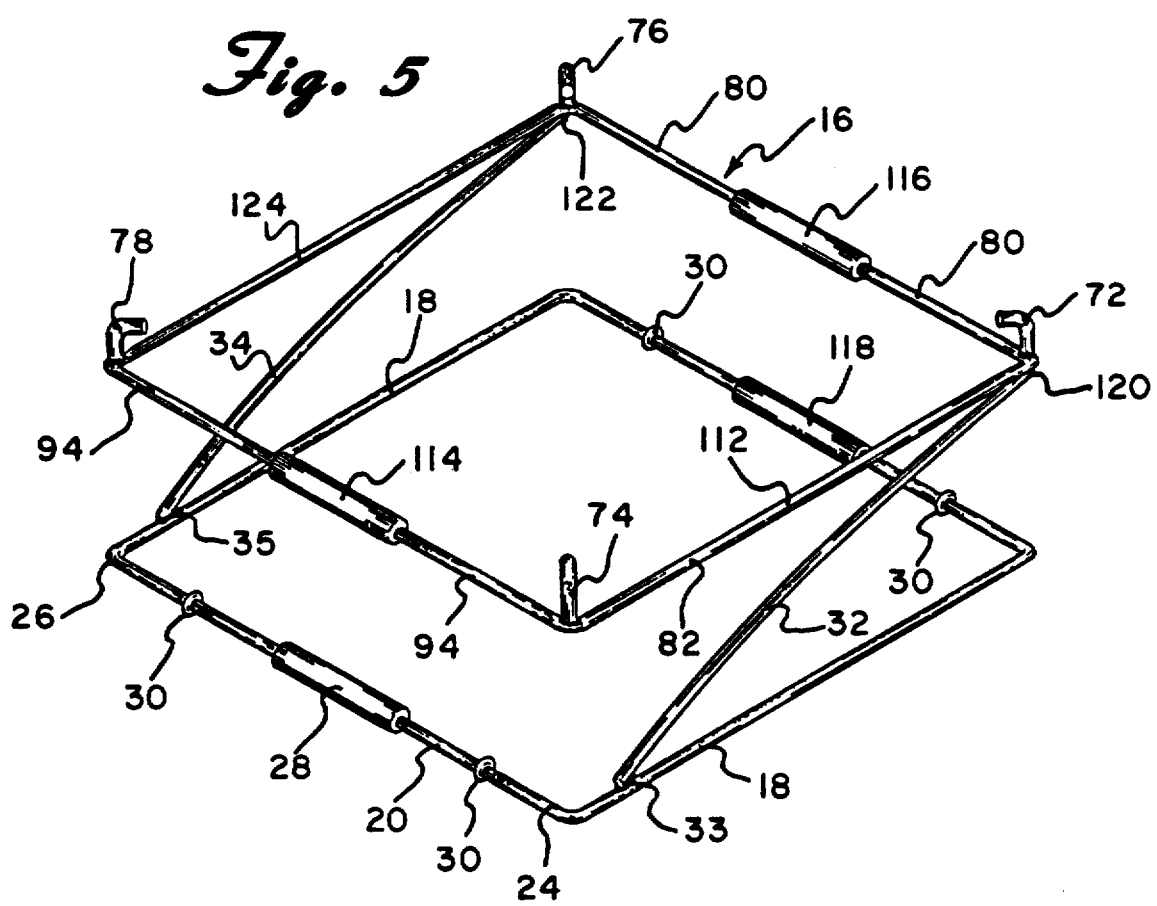

PET BED AND ENCLOSURE

BACKGROUND OF THE INVENTION

This invention involves a pet bed and an enclosure. More specifically, the device of the invention is an enclosure generally to be used indoors and is specifically effective for cats.

Domesticated animals and particularly indoor pets are more content if they have an enclosure to enter and be at least partially protected from the household activities. Cats, in particular, enjoy their independence and at certain times crave solitude. Various types of enclosures have been constructed, some of them raised off the floor. A common construction is an enclosure constructed out of wood covered with carpeting. In time these enclosures tend to become infested with fleas or other insects and are difficult to clean. Tent-like structures have been constructed for pets, but none offer the overall comfort of a bed raised off the ground.

The prior art devices do not satisfy the overall needs of a raised bed with air flow on all sides of the bed coupled with an enclosure to provide at least partial isolation of the pet. Further, the prior art devices do not attain the objects described hereinbelow.

SUMMARY OF THE INVENTION

It is an object of the present invention to provide a pet enclosure that can be easily cleaned, dismantled and each part cleaned.

It is a further object of the present invention to provide a bed raised off the ground with essentially full air flow around and under the bed.

It is an additional object of the present invention to provide a stable bed that is cushioned on springs without complex mechanisms.

It is a further object of the present invention to provide an enclosure constructed of cloth with sufficient porosity that the structure does not become stale.

It is an additional object of the present invention to provide a tent-like structure supported by frame members that conform to a hemispherical shape by attachment at both ends of each frame member and need not be formed.

It is a further object of the present invention to provide a tent-like apparatus with a cover that can be attached and disattached for cleaning purposes.

It is also an object of the present invention to provide a supported bed suspended above the floor with a resilient surface for added comfort of the pet.

It is an additional object of the invention to provide a raised bed and enclosure with rubber anti-slip feet.

It is a further object of the present invention to provide a bed and enclosure that can be easily broken down into relatively small and easily packed parts for initial packaging and later travelling by the owner such that the device can be used at home, carried on trip and set up at any location.

It is also an object of the present invention to provide a bed and enclosure for pets that is aesthetically pleasing in appearance capably of utilizing a quilted or patterned material of choice to provide the covering with suitable insulation from temperature changes and noise.

It is a particular object of the present invention to provide a hammock-like structure that includes a springy feel without the necessity of a mattress type structure.

An aspect of the invention is a pet bed and enclosure device that is particularly effective for cats that includes an upper frame that includes a front section, and a rear section. The device further includes a flexible sheet panel, preferably breathable fabric, suspended from and spanning the upper frame. The device also includes a base frame supportable on a floor including a front section and a rear section and two angled resilient support members each comprising upper and lower ends. Each lower end is structurally attached proximate the front section of the base frame; each support member is angled upwardly and rearwardly at a sharp acute angle from the base frame; and each upper end is structurally attached proximate the rear section of the upper frame. The front section of the upper frame is supported proximate over the front section of the base frame. The device further includes enclosure means supported over the upper frame to provide an enclosure for a pet lying on the sheet panel.

It is preferred that the angle of a line from lower points of attachment between the lower ends of the resilient support members and the base frame and upper points of attachment between upper ends of the resilient support members and the upper frame be in the range of about five to about forty-five degrees and more preferable in the range of about ten to about thirty degrees. It is further preferred that the resilient support members be curved convex upwardly. It is also preferred that the upper frame and lower frame be both rectangular in shape. It is more preferred that the upper frame and lower frame be both square in shape. It is further preferred that the flexible sheet panel be composed of fabric. It is also preferred that the device further include suspending means to suspend the flexible sheet panel from the upper frame and includes strips of hook and loop fabric fastener material attached in complimentary pairs proximate opposing edges, each pair being positioned parallel to each other lengthwise on the same side of the panel along an edge spaced apart a sufficient distance that the edge can be wound around a side of the upper frame and the complimentary hook and loop faces can attach to each other. It is further preferred that the upper frame include four corners and the enclosure means include a cover support means that includes two flexible resilient cover support members, and positioning means to hold the cover support members aligned such that median portions of the cover support members cross and to hold the ends of the cover support members proximate the corners of the upper frame member. It is also preferred that the enclosure means include a flexible cover panel shaped to over fit the cover support means and the positioning means includes crossed fabric casings attached to the cover panel. It is further preferred that the upper frame include four corners and that the device further include cover support means extending upwardly from the upper frame to support a flexible cover panel at a height over the upper frame, a flexible cover panel shaped to enclose the cover means that includes an opening of sufficient size and shape to allow a pet to enter and leave through the opening, and tab extensions outwardly from four corners of the cover panel with holes through each of the tab extensions, and hook members attached to and extending inwardly from each of the four corners of the upper frame of sufficient size and shape to interfit into the holes through the tab extensions pulled downwardly around the cover support means and over the hook members. It is further preferred that the cover panel be constructed of breathable fabric and more preferred that the sheet panel and the cover panel be constructed of breathable fabric.

Another aspect of the invention is a pet bed and enclosure device that includes an upper frame that includes four corners and a flexible sheet panel suspended from and spanning the upper frame. The device further includes base support means supportable on a floor to support the upper frame and enclosure means supported over the upper frame to provide an enclosure for a pet lying on the sheet panel. The enclosure means includes a cover support means that includes two flexible resilient cover support members, and positioning means to hold the cover support members aligned such that median portions of the cover support members cross and the ends of the cover support members are held proximate the corners of the upper frame member. It is preferred that this device further include a flexible sheet cover panel shaped to enclose the cover support means that includes an opening of sufficient size and shape to allow a pet to enter and leave through the opening, and tab extensions outwardly from four corners of the cover panel with holes through each of the tab extensions, and hook members attached to and extending inwardly from each of the four corners of the upper frame of sufficient size and shape to interfit into the holes through the tab extensions pulled downwardly around the cover support means and over the hook members.

Another aspect of the invention is a pet bed and enclosure device that includes an upper frame comprising four corners with hook members attached to an extending inwardly from each of the four corners. The device further includes a flexible sheet panel suspended from and spanning the upper frame and base support means supportable on a floor to support the upper frame. The device also includes enclosure means supported over the upper frame to provide an enclosure for a pet lying on the sheet panel that includes cover support means extending upwardly from the upper frame to support a cover panel at a height over the upper frame. The enclosure means also includes a flexible cover panel shaped to enclose the cover frames means, the cover panel including an opening of sufficient size and shape to allow a pet to enter and leave through the opening, and tab extensions outwardly from four corners of the cover panel with holes through each of the tab extensions. The size and shape of the hooks are sufficient to interfit into the holes through the tab extensions pulled downwardly around the cover support means and over the hook members.

BRIEF DESCRIPTION OF DRAWINGS

FIG. 1 is a perspective view of a pet bed and enclosure device of the present invention.

FIG. 2 is a cut-away view taken along lines 2—2 of FIG. 1.

FIG. 3 is a partially exploded perspective view of the device illustrated in FIG. 1 wherein the enclosure device has been disattached from the bed portion of the device.

FIG. 4 is a bottom view of the enclosure device taken along lines 4—4 of FIG. 3.

FIG. 5 is a perspective view of the frame of the device illustrated in FIG. 1 with the bed sheet panel removed.

DESCRIPTION OF PREFERRED EMBODIMENTS

In FIG. 1, pet bed and enclosure device 10 is shown including bed device 1'' and enclosure device 14 connected together ready for use. These latter portions of device 10 are shown separated in FIG. 3 and frame support device 16, which supports bed panel 40 and enclosure device 14, is shown in FIG. 5. Device 10 rests on base frame 18 constructed of three-sixteenth inch round rod in the shape of a square. Frame 18 has front section 20 which is under opening 38 into enclosure 14. Base frame 18 also includes rear section 22, right section 24 and left section 26. The left and right sections are separable held together by aluminum tubing connection sleeve 28 in the front and connection sleeve 29 in the rear, hidden in this view. Soft rubber washer feet 30 are slid over sections of the rod in the front and rear and are positioned close to the four corners of base frame 18. For clarification purposes, washer feet 30 are shown spaced away from the corners, but are preferably positioned as close to the corners as possible to provide as large a foot print of the device for stability purposes as possible. Right inclined support member 32 is a one quarter inch spring steel rod welded at the bottom end through weld attachment 33 to base frame 18 proximate the right front corner on right section 24 of frame 18. Likewise, left inclined support member 34 is attached at weld attachment position 35 proximate the left front corner of base frame 18. Both inclined support members 32 and 34 are angled upwardly and to the rear at about a seventeen degree angle. That angle is measured from a line between the attachment point of the bottom end of each inclined member and the attachment point at the upper end of the inclined member to an upper frame, hidden in this view. This method of inclination is used since both inclined members are slightly curved convex upwardly to provide additional spring effect for the upper frame and the fabric bed 40 suspended from it. Cover panel 36 is constructed of a quilted construction of two layers of fabric sandwiching a layer of fiber matting to provide added insulation from heat and noise for the pet inside. Cover panel 36 is formed in a bubble shape with stitching 42 crossing across from corner to corner to attach casings on the inside which position and hold flexible resilient cover support members which support cover panel 36. Opening 38 is provided to allow the pet to enter and leave the enclosure at will. Cover panel 36, and thus enclosure device 14 is attached to the upper frame at each corner. The corners are identified front right corner 44, left front corner 46, right rear corner 48 and left rear corner 50, the latter hidden in this view. Flexible sheet panel 40 is suspended from and spans the upper frame, also hidden in this view. Panel 40, which serves as the bed, is constructed of cotton duck fabric material of sufficient size to have its edges fold around the rod members of the upper frame and be attached through VELCRO ® fasteners. For example, front edge 52 of panel 40 extends down and under the front frame member of the upper frame, overlapping itself and connecting to itself through VELCRO ® fasteners, attached in strips along each edge through stitching 56 on the front edge 52 and stitching 58 along right side edge 54.

In the cut-away view illustrated in FIG. 2, the attachment between enclosure device 14 and bed device 12 is illustrated. Cover panel 36 is shaped and supported by support member 60, as well as support member 61, the latter not shown in this drawing. Members 60 and 61 are flexible polymeric plastic tubing about one-quarter inch in diameter with sufficient resilience and rigidity to provide structural support for cover 36. Typical polymers include nylon, polyvinyl chloride, polypropelyne and like polymers. Tube support member 60 is held in position by fabric casing 96. The combination of the size and shape of cover 36, the length of tube 96 and the tab extensions, such as right rear tab 62 hooked over right rear hook 72, yields the shape and attachment of cover device 14 to bed device 12. Tab extension 62 extending from the right rear section of cover 42 extends over around and under the end of support member 60, being drawn inwardly to hook over the horizontal portion of hook 72 and dropping down to the horizontal portion of that same hook. Hook 72 is an "L" shaped hook welded to the right rear corner of the upper frame. The upper frame is constructed of a one-quarter inch steel rod bent at the corners to form a square frame with the ends welded together. At the right rear corner, upper frame rear member 80 meets upper frame right side member 82 at the right rear corner at which position hook member 72 is welded. Hook 72 extends upwardly about one-half inch and is formed to extend horizontally and inwardly toward the center of the upper frame about one-half inch. Tab extension 62 is pulled inwardly over the horizontal portion of hook 72 engaging hole 70 through the tab over the hook. When each of the four tabs at each corner are hooked over the four hooks at the corners of the upper frame, tension is placed on cover device 14 securely holding it in place, but allowing it to be removed by merely increasing the tension inwardly by pulling the tabs up and away from the corner hooks. Attachment of sheet panel 40, which serves as the bed surface, is also shown in FIG. 2. Along right edge 54 of panel 40 are sewn hook VELCRO ® fastener strip 84 and loop VELCRO ® fastener strip 86 essentially along the entire length of that edge on the same side of panel. Edge 54 is drawn over right side upper frame member 82, down and around that member such that the hook and loop fastener strips attach to each other to hold edge 54 to the upper frame. Likewise, the other three edges, including rear edge 88 of panel 40 are connected through VELCRO ® fastener strips along each edge.

As shown in FIG. 3, enclosure device 14 is shown separated from device 12. In the partial cut away section of the front right corner of cover 36, tab extension 64 equipped with hole 104 is shown folded under in such a position that it can hook over and down on hook 74 extending upwardly from the front right corner of the upper frame at the juncture of front upper frame member 94 with right side upper frame side member 82, both frame members being mostly covered by edge sections 52 and 54 of cover 36, respectively. Support member 61 extends from corner to corner and is held in position by fabric casing 98 which is stitchably attached through stitchings 42 to the underside of cover 36. Casing 98 extends to the proximate center of cover 36. As shown in FIG. 4, casing 100 encloses the other end of support member 61 and extends from the center to the left rear corner of cover 36 where the opposite end of support member 61 terminates. As further shown in FIG. 3, sheet panel 40 is attached along front edge 52, right side edge 54, rear edge 88, and left side edge 110 using the VELCRO ® strip closures as described and illustrated in FIG. 2. At each corner of the upper frame, hook members 72, 74, 76, and 88 are welded to extend upwardly and inwardly to receive the holes of the tab extensions to hold enclosure device 14 in place.

In FIG. 4, enclosure device 14 is shown in a bottom view where support members 60 and 61 are held in their respective casings from corner to diagonal corner curving upwardly and crossing at a medium section of cover panel 36. Support member 60 is held in position by casing 96 extending from the right rear corner to a central section and by corner 102 extending in that same line from that center section toward the left front corner. Support member 61 is held in position by casings 96 and 102 extending from the right rear corner to the left front corner. The two rear tab extensions, 62 and 66 are shown in this view extending outwardly from each corner to expose the ends of the support members. When device 14 is attached to device 16, these tab extensions are pulled downwardly and inwardly to engage their respective hook members through holes 70 and 106 respectively. In like fashion, front tabs extensions 64 and 68 are shown in this view pulled downwardly and inwardly as they would be pulled around the upper support member ends to engage hook members 78 and 74 respectively. Hole 104 in tab extension 64 and hole 108 in tab extension 68 engage these respective hook members.

In FIG. 5, frame device 16 is illustrated with sheet panel 40 removed for cleaning or temporary disassembling. All of the structural members of frame 16 are constructed of one-quarter inch spring steel rod with the ends of each rod welded to the adjacent member. Upper frame 112 is formed in two pieces, each bent into a "U" shape and held in position by front upper tubular connector sleeve 114 and rear upper tubular connector sleeve 116, each being aluminum tubing with an inside diameter to slideably and firmly connect the free ends of the two "U" shaped members that form upper frame 112. With this construction, front upper frame member 94 is actually two pieces connected in the middle by sleeve 114 while rear upper frame rear member 80 is also in two pieces joined together with sleeve 116. Likewise, base frame 18 is constructed of two "U" shape members, left section 26 and right section 24 joined by front sleeve connector 28 and lower rear sleeve connector 118. When all of the sleeve connectors are disattached, two halves of frame support device are left in tact since the section of the upper frame and the section of the base frame are still structurally connected by right inclined support member 32 and left incline support member 34. Right inclined support member 32 is weldably attached proximate the front right corner of base frame 18 extending upwardly and rearwardly to be weldably attached at end 120 proximate the right rear corner of upper frame 112. The angle of inclination of incline support member 32 is measured by measuring the angle between a line between points 33 and 120 with the line of the right side base member. As also shown in this view, support member 32, as well as support member 34 are curved slightly, convex upwardly to provide additional spring to the structure. Likewise, member 34 is weldably attached to base frame 18 proximate the front left corner extending upwardly and rearwardly to be weldably connected to upper frame 112 at the left rear corner at point 122. Again, the angle of inclination of support member 34 is measured from point 35 to point 112. With this frame structure, panel 40 suspended across upper frame 12 between front member 94 and rear member 80 and from right side member 112 to left side member 124, all of upper frame 112, provides a spring support. The spring support is provided by a combination of the cantilevered connection between the rear corners of upper frame 112 and the upper ends of inclined support members 32 and 34, the spring of these later inclined members, and the connection of the bottom ends of these inclined members proximate the front corners of base frame 18, positioning upper frame front member 94 proximately over front member 20 of base frame 18.

While this invention has been described with reference to the specific embodiments disclosed herein, it is not confined to the details set forth and the patent is intended to include modifications and changes which may come within and extend from the following claims.

I claim:

1. A pet bed and enclosure device comprising:
   (a) an upper frame comprising a front section, and a rear section,
   (b) a flexible sheet panel suspended from and spanning the upper frame,
   (c) a base frame supportable on a floor comprising a front section and a rear section,
   (d) two angled resilient support members each comprising upper and lower ends wherein:
      (i) each lower end is structurally attached proximate the front section of the base frame,
      (ii) each support member is angled upwardly and rearwardly at a sharp acute angle from the base frame, and
      (iii) each upper end is structurally attached proximate the rear section of the upper frame,
   wherein the front section of the upper frame is supported proximate over the front section of the base frame, and
   (e) enclosure means supported over the upper frame to provide an enclosure for a pet lying on the sheet panel.

2. The device of claim 1 wherein the angle of a lines from lower points of attachment between the lower ends of the resilient support members and the base frame and upper points of attachment between the upper ends of the resilient support members and the upper frame is in the range of about five to about forty-five degrees.

3. The device of claim 1 wherein the angle of a lines from lower points of attachment between the lower ends of the resilient support members and the base frame and upper points of attachment between the upper ends of the resilient support members and the upper frame is in the range of about ten to about thirty degrees.

4. The device of claim 1 wherein the resilient support members are curved convex upwardly.

5. The device of claim 1 wherein the upper frame and lower frame are both rectangular in shape.

6. The device of claim 5 wherein the upper frame and lower frame are both square in shape.

7. The device of claim 1 wherein the flexible sheet panel is composed of fabric.

8. The device of claim 1 wherein the device further comprises suspending means to suspend the flexible sheet panel from the upper frame comprising strips of hook and loop fabric fastener material attached in complimentary pairs proximate opposing edges, each pair being positioned parallel to each other lengthwise on the same side of the panel along an edge spaced apart a sufficient distance that the edge can be wound around a side of the upper frame and the complimentary hook and loop faces can attach to each other.

9. The device of claim 1 wherein the upper frame comprises four corners and the enclosure means comprises a cover support means comprising:
   (a) two flexible resilient cover support members, and
   (b) positioning means to hold the cover support members aligned such that median portions of the cover support members cross and to hold each end of the cover support members proximate to a respective corner of the upper frame member.

10. The device of claim 9 wherein the enclosure means comprises a flexible cover panel shaped to over fit the cover support means and the positioning means comprises fabric casings attached to the cover panel.

11. The device of claim 1 wherein the upper frame comprises four corners and the device further comprises:
   (a) cover support means extending upwardly from the upper frame to support a flexible cover panel at a height over the upper frame.
   (b) a flexible cover panel shaped to enclose the cover means comprising:
      (i) an opening of sufficient size and shape to allow a pet to enter and leave through the opening, and
      (ii) tab extensions projecting outwardly from four corners of the cover panel with holes through each of the tab extensions, and
   (c) hook members attached to and extending inwardly from each of the four corners of the upper frame of sufficient size and shape to interfit into the holes through the tab extensions pulled downwardly around the cover support means and over the hook members.

12. The device of claim 11 wherein the cover panel is constructed of breathable fabric.

13. The device of claim 11 wherein the sheet panel and cover panel are constructed of breathable fabric.

14. The device of claim 1 wherein the sheet panel is constructed of breathable fabric.

15. A pet bed and enclosure device comprising:
   (a) an upper frame comprising four corners.
   (b) a flexible sheet panel suspended from and spanning the upper frame.
   (c) base support means supportable on a floor to support the upper frame,
   (e) enclosure means supported over the upper frame to provide an enclosure for a pet lying on the sheet panel comprising a cover support means comprising:
      (i) two flexible resilient cover support members, and
      (ii) positioning means to hold the cover support members aligned such that median portions of the cover support members cross and each end of the cover support members are held proximate to a respective of the upper frame member.
   (f) a flexible sheet cover panel shaped to enclose the cover support means comprising:
      (i) an opening of sufficient size and shape to allow a pet to enter and leave through the opening, and
      (ii) tab extensions projecting outwardly from four corners of the cover panel with holes through each of the tab extensions, and
   (g) hook members attached to and extending inwardly from each of the four corners of the upper frame of sufficient size and shape to interfit into the holes through the tab extensions pulled downwardly around the cover support means and over the hook members.

16. The device of claim 15 wherein the enclosure means comprises a flexible cover panel shaped to enclose the cover support means and the positioning means comprises fabric casings attached to the cover panel.

17. A pet bed and enclosure device comprising:
   (A) an upper frame comprising four corners,
   (B) hook members attached to and extending inwardly from each of the four corners of the upper frame,
   (C) a flexible sheet panel suspended from and spanning the upper frame,
   (D) base support means supportable on a floor to support the upper frame,
   (E) enclosure means supported over the upper frame to provide an enclosure for a pet lying on the sheet panel comprising:
      (i) cover support means extending upwardly from the upper frame to support a cover panel at a height over the upper frame,
      (ii) a flexible cover panel shaped to enclose the cover frame means comprising:
         (a) an opening of sufficient size and shape to allow a pet to enter and leave through the opening, and
         (b) tab extensions projecting outwardly from four corners of the cover panel with holes through each of the tab extensions,
   wherein the tab extensions are pulled downwardly around the cover support means and over the hook members such that the hooks are sufficient to interfit into the holes.

18. The device of claim 17 wherein the flexible sheet and cover panels are constructed of breathable fabric.

19. A pet bed and enclosure device comprising:
   (A) an upper frame comprising a front section, a rear section, and four corners,
   (B) hook members attached to and extending inwardly from each of the four corners of the upper frame,
   (C) a flexible sheet panel suspended from and spanning the upper frame,
   (D) a base frame supportable on a floor comprising a front section and a rear section,
   (E) two angled resilient support members each comprising upper and lower ends wherein:
      (i) each lower end is structurally attached proximate the front section of the base frame,
      (ii) each support member is angled upwardly and rearwardly at a sharp acute angle from the base frame, and
      (iii) each upper end is structurally attached proximate the rear section of the upper frame,
   wherein the front section of the upper frame is supported proximate over the front section of the base frame, and
   (F) enclosure means supported over the upper frame to provide an enclosure for a pet lying on the sheet panel comprising:
      (i) cover support means comprising:
         (a) two flexible resilient cover support members, and
         (b) positioning means to hold the cover support members aligned such that median portions of the cover support members cross and each end of the cover support members are held proximate to a respective corner of the upper frame member, and
      (ii) a flexible cover panel shaped to over fit the cover support means comprising:
         (a) an opening of sufficient size and shape to allow a pet to enter and leave through the opening, and
         (b) tab extensions projecting outwardly from four corners of the cover panel with holes through each of the tab extensions,
   wherein the tab extensions are pulled downwardly around the cover support means and over the hook members such that the hooks are sufficient to interfit into the holes.

* * * * *